United States Patent [19]

Petersen

[11] Patent Number: 4,856,619

[45] Date of Patent: Aug. 15, 1989

[54] AIRCRAFT WHEEL DRIVE KEY AND HEATSHIELD ASSEMBLY

[75] Inventor: Don W. Petersen, North Canton, Ohio

[73] Assignee: Loral Corporation, New York, N.Y.

[21] Appl. No.: 202,614

[22] Filed: Jun. 6, 1988

[51] Int. Cl.⁴ .................. B64C 25/36; B60B 19/00
[52] U.S. Cl. .................. 188/18 A; 188/71.6; 188/264 A; 188/264 G; 301/6 A; 301/6 CS; 301/6 WB; 244/103 R; 244/111
[58] Field of Search .......... 244/110 A, 111, 103 R; 188/18 A, 71.5, 71.6, 264 A, 264 AA, 264 G; 301/6 R, 6 A, 6 CS, 6 E, 6 WB

[56] References Cited

U.S. PATENT DOCUMENTS

| | | |
|---|---|---|
| 3,051,528 | 8/1962 | Rogers .................. 188/264 G |
| 3,191,735 | 6/1965 | Wavak .................. 301/6 R |
| 3,958,833 | 5/1976 | Stanton .................. 301/6 CS |
| 3,983,974 | 10/1976 | Dowell et al. .......... 188/264 AA |
| 4,017,123 | 4/1977 | Horner et al. .......... 188/264 G |
| 4,084,857 | 4/1978 | VanderVeen .......... 188/264 G |

Primary Examiner—Sherman D. Basinger
Assistant Examiner—Rodney Corl
Attorney, Agent, or Firm—P. E. Milliken; L. A. Germain

[57] ABSTRACT

An assembly comprises drive key wearplates mounted in pairs to longitudinal side surfaces of each of a plurality of wheel key bosses and retaining members are fastened transversely across the top of a boss to engage both wearplates of the pair. A heatshield is positioned within the wheel bore between adjacent wheel key bosses and its opposite lateral edges engage respective wearplates in a manner such that it may not move either axially or radially within the bore.

10 Claims, 4 Drawing Sheets

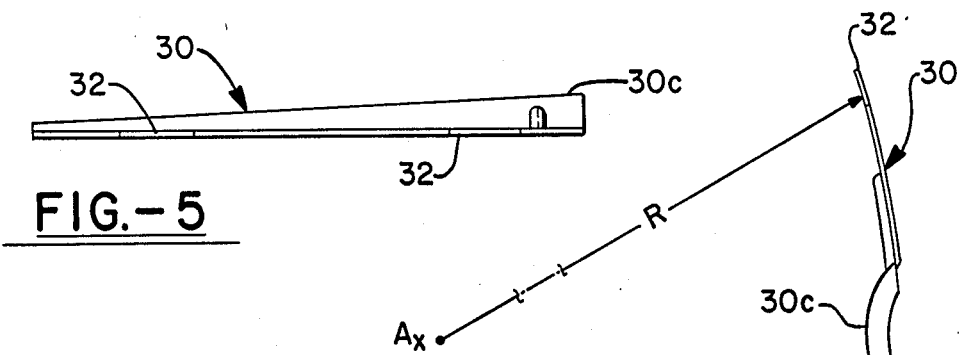
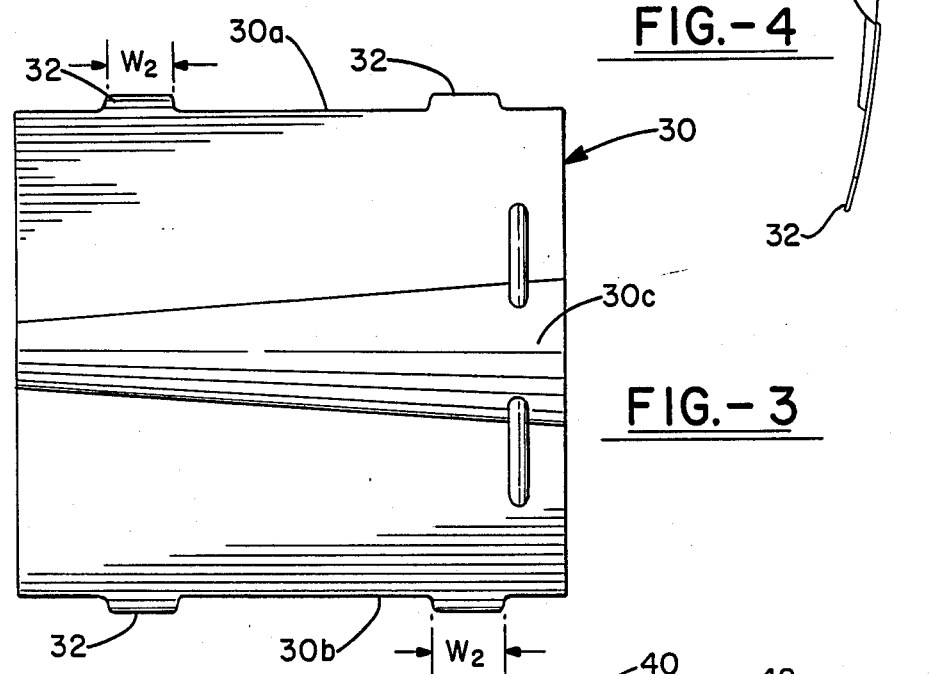
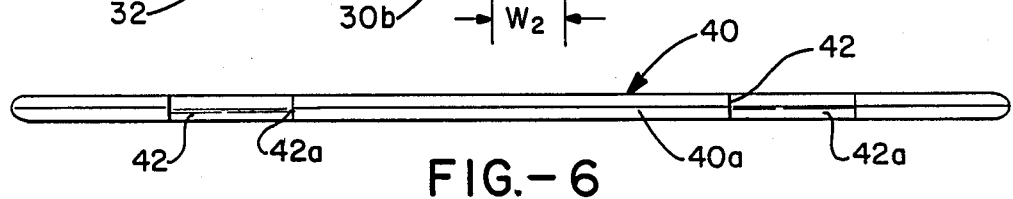
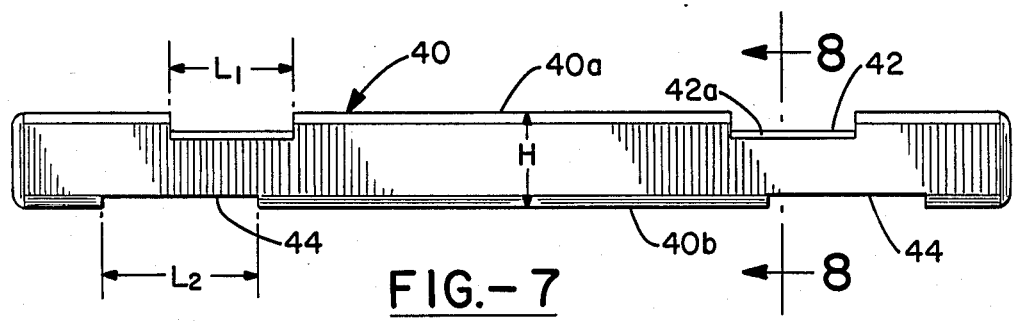

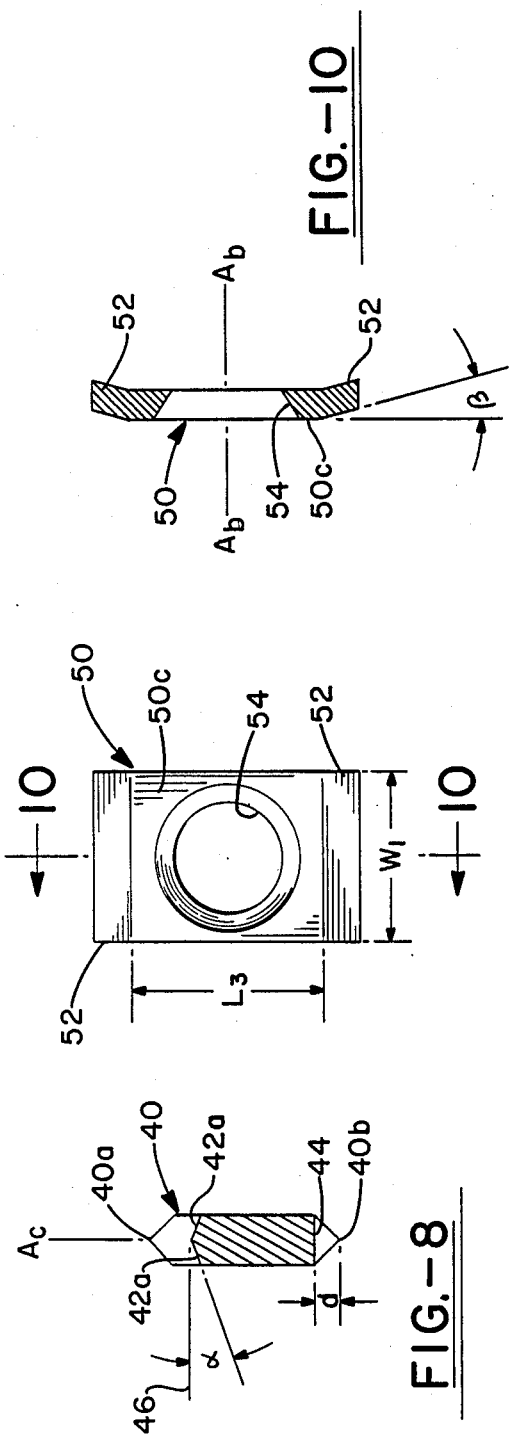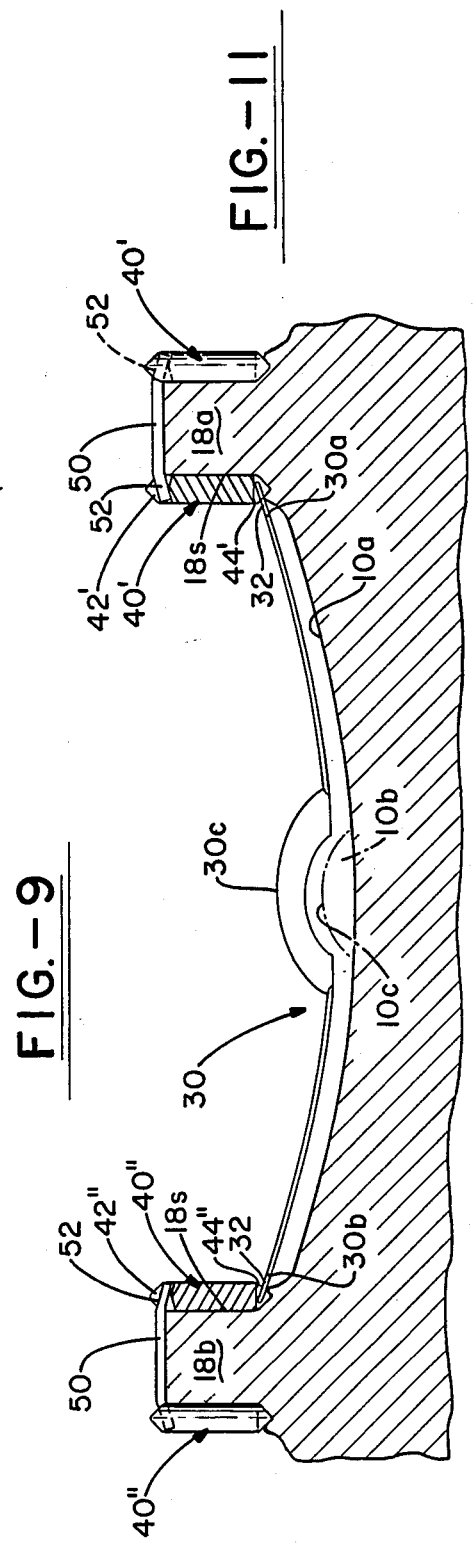

AIRCRAFT WHEEL DRIVE KEY AND HEATSHIELD ASSEMBLY

BACKGROUND OF THE INVENTION

This invention generally pertains to aircraft wheels and more particularly to a wheel drive key and heatshield assembly applicable to aircraft multi-disk wheels and brakes.

Many presently designed forged aluminum wheels which are used on large jetliner aircraft are characterized by channel-type drive keys oriented in a manner to engage rotor disks of a multi-disk brake, alternately mounted disks of the brake being relatively stationary and keyed to a brake torque tube-member. The wheel drive keys are U-shaped channels which may be as long as a foot in length and these are mounted on axially-oriented key bosses machined into and forming an integral part of an inboard-facing bore surface of the wheel. The channel keys are affixed and maintained in place on the key boss by screws which thread into bores in the boss.

Forged aluminum aircraft wheels, while offering lighter weight, are costly to manufacture because of the critical tolerances and heat treatment processing required. The wheel drive keys, which are manufactured apart from the wheel, are subject to various misalignments when being mounted on the key bosses and such misalignments may result in stresses being placed on the drive key, the key boss, and/or the mounting screws. Such stresses may also be increased during actual operation by thermal differential expansion forces between the various metals which comprise the parts and this results in premature fatigue cracking in the overstressed areas. This, of course, is detrimental to the continued safe operation of the total wheel and brake assembly.

It is, therefore, in accordance with one aspect of the present invention, an object to provide a drive key and heatshield assembly applicable to aircraft wheels which reduces the occurrence of stress fracturing while being lighter in weight and more economical to manufacture than presently configured wheel drive key assemblies.

In accordance with another aspect of the present invention, it is an object to provide a drive key and heatshield assembly that is structurally superior and eliminates many of the field servicing problems which have plagued other configurations proposed for the same service and application.

SUMMARY OF THE INVENTION

A drive key and heatshield assembly adapted for mounting in association with a plurality of longitudinal and axially-oriented wheel key bosses which are integrally formed on an inboard-facing bore surface of a forged wheel comprises in combination:

a plurality of rectangularly-shaped drive key wearplates, the wearplates mounted in pairs on each of said wheel key bosses and each wearplate characterized by at least two longitudinal slots within the top and bottom edges of the wearplate;

retaining means mounted transversely across the top surface of each wheel key boss and having sufficient length to engage each of the pair of mounted drive key wearplates within the slots on the top edges of the wearplates; and a plurality of substantially rectangularly-shaped heatshields each having a curved configuration which substantially matches the curvature of the wheel bore and positioned between adjacent wheel key bosses within the bore and characterized by at least two tabs extending from opposite lateral edges to engage the slots in the bottom edges of respective mounted drive key wearplates, said heatshields being substantially restrained from both axial and radial movement within the wheel bore.

BRIEF DESCRIPTION OF THE DRAWINGS

The invention and various aspects and advantages thereof will be better understood when consideration is given to the following detailed description and the accompanying drawings wherein, in the several figures, like reference numerals indicate like elements and wherein:

FIG. 3 is a top plan view of a heatshield member forming a part of the assembly;

FIG. 4 is an end view of the heatshield shown in FIG. 3;

FIG. 5 is a side elevational view of the heatshield shown in FIG. 3;

FIG. 6 is a top view of a drive key wearplate forming another part of the assembly;

FIG. 7 is a side elevational view of the drive key wearplate;

FIG. 8 is an enlarged cross-sectional view through the drive key wearplate as may be taken on line 8—8 of FIG. 7;

FIG. 9 is a top plan view of a wearplate retaining member forming another part of the assembly;

FIG. 10 is an elevational view in cross-section through the retaining member as may be taken on line 10—10 of FIG. 9;

FIG. 11 is an elevational view, partially in cross-section, illustrating the mounting arrangement of drive key wearplates and a heatshield member in relation to adjacent drive key bosses of a wheel.

DETAILED DESCRIPTION OF THE INVENTION

Figure 1:
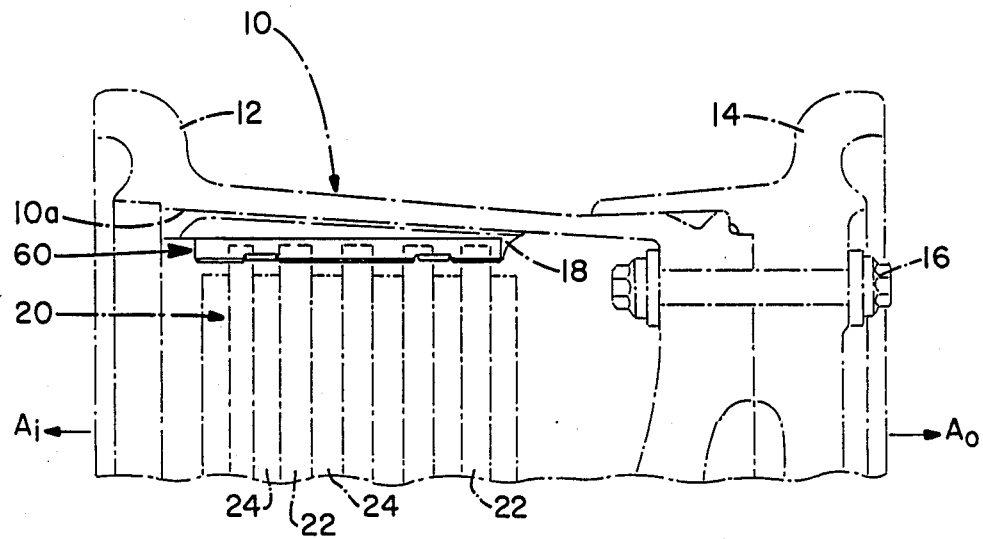
FIG. 1 is an elevational view of a portion of an aircraft wheel (shown in ghost lines) illustrating the environment of a drive key and heatshield assembly which comprises the present invention.

Referring to FIG. 1 of the drawings, a portion of an aircraft wheel is illustrated in ghost lines and generally indicated by reference numeral 10. The portion illustrated is a section through the wheel which is radially distant from the wheel axis of rotation (not shown) and includes inboard and outboard tire bead seat flanges 12 and 14 respectively. The outboard bead seat flange 14 forms part of a separable wheel portion that is fastened to the inboard wheel portion via a plurality of bolts 16 in a conventional manner. The inboard direction of the wheel 10 is indicated by arrow $A_i$ while the outboard direction is indicated by arrow $A_o$.

The subject of the present invention is a drive key and heatshield assembly and it is illustrated in FIG. 1 by the solid lines and generally indicated by reference numeral 60. The assembly 60 is associated with a wheel drive key boss 18 which is one of a plurality of such bosses and these conventionally form an integral part of a forged aluminum wheel as they are machined into an inside surface of an inboard wheel bore indicated at 10a. The drive key bosses 18 are axially aligned and in a spaced-apart circumferential orientation about the surface of the wheel bore 10a . The plurality of key bosses 18 carry hardened metallic drive keys which engage slots formed in the outer peripheries of a plurality of brake disks 22. The brake disks 22 operate in conjunction with alternate brake disks 24 which comprise a brake disk-stack generally indicated at reference numeral 20. While the brake disks 22 are keyed to rotate with the wheel 10, the alternate brake disks 24 are keyed to a brake torque tube (not shown) and are relatively stationary with respect to the disks 22. An axial clamping pressure force exerted on the brake disk stack 20 will result in braking of the wheel 10.

Figure 2:
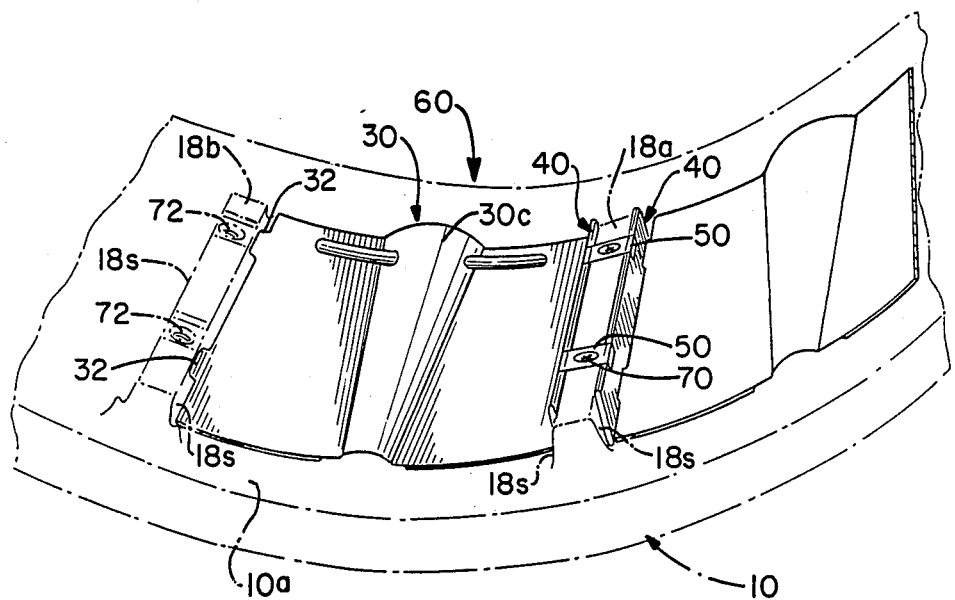
FIG. 2 is a perspective view showing the key wearplate and heatshield assembly as it may be mounted within a wheel bore (shown in ghost lines)

FIG. 2 of the drawings illustrates the position of the drive key and heatshield assembly 60 as it may be mounted within the wheel bore 10a. Wheel drive key bosses 18a and 18b are shown, the bosses being but two of a plurality of such bosses which are formed within and about the wheel bore 10a. A heatshield member 30, which forms a part of the assembly 60, is positioned between adjacent key bosses. Obviously, the total number of heatshields will vary with the size of the wheel and the number of wheel key bosses machined within the wheel bore 10a. In any event, the heat-shields are intended to protect the wheel and a mounted tire from extremes of heat which may be generated in the brake assembly.

Metallic drive keys which form another part of the assembly 60 are indicated in the drawing by reference numeral 40. The drive keys 40 are in a configuration of wearplates which are mounted in pairs, each to a longitudinal side face 18s of the wheel key boss 18. Wheel key boss 18a is shown with the mounted wearplates 40 while key boss 18b is shown having no wearplates 40 attached to it. The drive key wearplates 40 are maintained in position on a wheel key boss 18 by way of retaining members 50 which span transversely across the key boss and engage the wearplates 40 in a manner to be described hereinafter. The retaining members 50 are fastened to the wheel key boss 18 via screws or bolts 70 which thread into bores 72 and these are more clearly shown in the boss 18b. When the pairs of drive key wearplates 40 are mounted on the wheel key bosses 18, lateral bottom edges engage with the heatshield 30 to maintain it in position within the wheel bore 10a. As shown at wheel key boss 18b, edge tabs 32 form a part of the lateral edges of the heatshield adjacent a wheel key boss and these tabs functionally engage slots in the bottom edge of a mounted wearplate. Thus, drive key wearplates 40 on facing side surfaces 18s of adjacent wheel key bosses 18 cooperate to maintain a heatshield 30 in position between them. In this circumstance, the only fasteners which are required for the assembly 60 are the retaining members 50 and screws 70.

Attention is directed to FIGS. 3, 4, and 5 of the drawings which show the principal views of a particular configuration for a heatshield member 30. While the heatshield is primarily rectangular in shape, it is characterized by tabs 32 which extend from opposite side edges 30a and 30b respectively. The heatshield 30 is made to conform substantially to the curvature of the wheel bore 10a as defined by a radius "R" having its focus on the axis of the wheel indicated at Ax in FIG. 4. Generally, heatshields for aircraft service will comprise stainless steel or any of the non-corrosive metals used for such service Various wheel designs have different inboard bore configurations and the heatshields may, of course, be made to conform to any bore 10a. The heatshield illustrated in the drawings has a semi-cone-shaped central portion 30c which conforms to a particular aircraft wheel and it will be recognized by those skilled in the art that some other wheel designs will not require a heatshield of the configuration shown. Therefore, the invention herein claimed is not considered limited in any way to the exact heatshield shown in the drawings. In any event, an important aspect of the heatshield design is that it includes a plurality of edge tabs 32 and these co-operate with the wheel drive key wearplates 40 in a manner to be more fully described hereinafter.

FIGS. 6, 7, and 8 illustrate the principal views of a drive key wearplate 40. The wearplates 40 are substantially rectangular, the longitudinal length thereof being substantially the length of a wheel key boss 18 and having a height "H" which substantially covers the side surface area of a key boss 18. This is clearly evident in FIG. 2 of the drawings Further, each wearplate 40 is characterized by at least two slots 42 machined through the top lateral edge 40a and these have a length $l_1$ which is sufficient to accept the width $W_1$ of a retaining member 50 in the manner also illustrated in FIG. 2. Each wearplate 40 is further characterized by at least two slots 44 machined through the bottom lateral edge 40b and these have a length $L_2$ that is sufficient to accept the width $W_2$ of an edge tab 32 forming the part of a heatshield 30 as illustrated in FIG. 3. A cross-section through the wearplate in the area of the slots 42 and 44 is illustrated in FIG. 8. The slots 42 are characterized by tapered bottom surfaces 42a that are symmetrical with respect to the central vertical axis indicated at $A_c$. An angle $\alpha$ is defined with respect to the horizontal indicated at 46 and may be within the range of 15-45 degrees. The purpose of the angled bottom surface is to co-operate with a retaining member 50 in such a way as to draw the wearplate against the side surface 18s of a wheel key boss 18 when the retaining member 50 is fastened into position onto the key boss. The arrangement is clearly illustrated in FIG. 2 of the drawings. The symmetrical configuration of the bottom surface 42a allows wearplates 40 to be mounted on either side surface 18s of a wheel key boss 18.

Further with respect to FIG. 8, the slots 44 in the bottom lateral edge 40b have a depth "d" sufficient to carry a heatshield edge tab 32 when the wearplate 40 is mounted to a wheel key boss 18. The relationship between the slots 44 and the edge tabs 32 will be more fully appreciated with respect to the description of FIGS. 11 and 12 to follow hereinafter.

FIGS. 9 and 10 of the drawings illustrate the retaining member 50 in a top plan view and in an elevational, longitudinal, cross-sectional view respectively. The retaining member 50 comprises a flat steel stock which preferably exhibits a spring-steel characteristic. The ends indicated at 52 are bent at an angle $\beta$ which substantially corresponds to the angle $\alpha$ machined into the bottom surface 42a of the slots 42 in the top edge of the drive key wearplates 40. A bore 54 passes through the center portion indicated at 50c and it is coaxial with a central axis $A_b$ of the retaining member. The central portion 50c has a length L₃ that substantially corresponds to the width across a wheel key boss 18 and the ends 52 extend sufficiently to engage a drive key wearplate 40 on either side of a boss 18. The engagement with a wearplate 40 is, of course, made with the outside tapered bottom surface 42a within a slot 42. Thus, the angular relationship of the ends 52 with the slot 42 tends to force the wearplates 40 against the side surface 18s of a wheel key boss 18.

FIG. 11 of the drawings illustrates the interrelationship which exists between the various elements of the assembly 60 when mounted to a wheel 10. In the drawing, adjacent wheel key bosses 18 are indicated by reference numerals 18a and 18b. Key boss 18a has a pair of drive key wearplates 40' mounted to it while key boss 18b has a pair key wearplates 40" mounted to it. A heatshield member 30 is positioned between the key bosses 18a and 18b and the lateral edges 30a and 30b which have edge tabs 32 extending therefrom are contiguous to the respective key bosses 18a and 18b. It will, of course, be appreciated from the drawings and the foregoing description, that the edge tabs 32 of the heatshield 30 are retained within the slots 44. For example, the tabs 32 associated with the heatshield lateral edge 30a are associated with the slots 44" in key wearplate 40' while the tabs 32 of the heatshield lateral edge 30b are associated with the slots 44" in the key wearplate 40". As clearly evident from the showing of FIG. 11, the heatshield-wearplate relationship is such as to suspend the heatshield between the adjacent key bosses 18a and 18b, or more specifically, between drive key wearplates 40', 40" which are mounted on facing side surfaces 18s of adjacent wheel key bosses 18. In this configuration, once the retaining members 50 are fastened down onto the wheel key bosses 18 by screws 70, the heatshields 30 may not move either radially or axially out of position within the wheel bore 10a.

FIG. 11 also illustrates the manner in which a heatshield member 30 may be formed to maintain a radial distance between it and the inside surface of the bore 10a when the bore includes additional contoured surfaces as indicated at reference numeral 10b. In this configuration, the semi-cone-shaped central portion 30c of the heatshield spans the surface 10c to maintain the clearance. The suspended mounting arrangement of the heatshields 30 provides an airspace between it and the surface of the bore 10a and this naturally enhances the isolation of the wheel from any heat generated in the wheel braking system.

Figure 12:
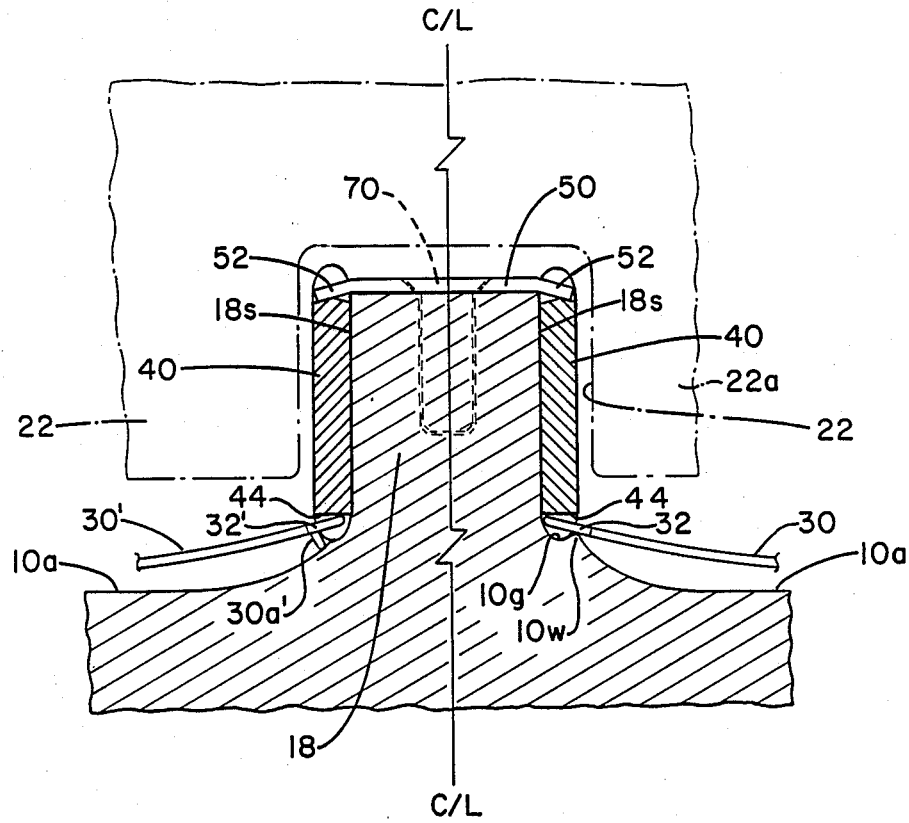
FIG. 12 is a transverse cross-sectional view of a wheel key boss which is divided by a section centerline C/L to illustrate two alternative arrangements of mounting heatshields relative to drive key wearplates, the ghost line portions being of a peripheral slot in a brake disk rotor as it may engage the drive key elements forming a part of the assembly compising the instant invention.

FIG. 12 of the drawings illustrates two ways in which the suspended condition of the heatshield may be accomplished. In the drawing, a wheel key boss 18 is shown in a transverse cross-section as it may carry a pair of drive key wearplates 40 in mounted positions on the longitudinal side surfaces 18s by way of the retaining members 50 which are affixed by mounting screws 70. A vertical section centerline C/L divides the wheel key boss 18 for the purpose of illustrating two embodiments for mounting a heatshield 30 with respect to the drive key wearplates and the wheel bore 10a.

Firstly, with respect to the portion of the figure to the right of the C/L, a drive key wearplate 40 is shown mounted to the side surface 18s of the wheel boss 18. The wearplate 40 is mounted by means of a retaining member 50 which is but one of a pair of such retaining means and by a screw 70 which functions to affix the retaining member in a groove transversely across the top of the boss 18. As clearly illustrated, the end 52 of the retaining member 50 engages the outside angular bottom surface 42a of the slot 42 provided in the top edge 40a of the wearplate. A heatshield 30 is partially illustrated, its edge tabs 32 engaging slots 44 provided in the bottom edge of the wearplate 40. It will, of course, be appreciated that when the heatshield 30 is mounted between adjacent wheel key bosses in the manner illustrated, the opposite side edges 30a, 30b which are contiguous to the bosses 18 will also prevent the bottom edges 40b of the wearplates 40 from moving away from a contacting engagement with the side surfaces 18s of the bosses 18. However, and to make doubly certain that this doesn't happen, a longitudinal groove 10g may be machined into and along the base of the wheel key boss 18. The bottom longitudinal edge 40b of a drive key wearplate 40 may then be seated within the groove. The outside wall 10w formed by the groove 10g will serve another purpose, and that, to provide a support for the heatshield edge tabs 32 as illustrated. Thus, a heatshield 30 will be supported in spaced relationship away from the surface of the wheel bore 10a by reason of the tabs 32 on opposite side edges 30a, 30b being supported on the groove walls 10w.

Referring now to the portion of the drawing to the left of the C/L, a drive key wearplate 40 is shown mounted to the side surface 18s of the wheel key boss 18. In this embodiment a portion of a heatshield 30' is illustrated, the portion including one side edge 30a' having edged tabs 32' formed therein. According to this embodiment, the tabs 32' are formed by bending down the portion of the edge 30a' which doesn't form a part of the tabs 32'. This bent portion provides a support and restraint for the bottom edge 40b of the mounted wearplate 40 in similar manner of the groove 10g described with respect to the opposite side embodiment The bent down edge 30a' shown in the figure and the opposite side edge 30b' (not shown) will obviously provide the necessary support also to maintain the heatshield 30' in spaced relationship to the surface of the wheel bore 10a.

Finally, with reference also to FIG. 12, a portion of a brake disk 22 is shown in ghost lines, the portion being in the area of the drive key slot 22a which forms a part of the disk. As clearly evident from the drawing, the contacting area between the disk slot 22a and the drive key wearplates 40 is primarily within the main structural portion of the wheel key boss 18. This configuration eliminates many of the fractures which occur to a drive key configuration when the forces and/or stresses are concentrated in a smaller portion of the boss or in the drive key itself, or in the mounting screws. It will also be appreciated from a consideration of the drawings that the slot-retainer and slot-tab relationships are such as to provide for thermal expansion and/or contraction of the various metal elements which comprise the assembly 60. For example, the slot length L1 of a slot 42 in the top edge of a wearplate 40 is slightly longer than the width W1 of a retainer member 50. Further, the slot length L2 of a slot 44 in the bottom edge of a wearplate 40 is slightly longer than the width W2 of a heatshield edge tab 32. These differentials of the functioning parts provide necessary room for thermal expansion of the elements, which thermal expansion is a normal occurrence in a functioning aircraft wheel and brake assembly. Such advantage may not be found in a configuration wherein the elements are directly fastened to either the wheel 10 or to the wheel drive key boss 18.

While certain specific elements and details have been shown for the purpose of illustrating the invention, it will be apparent to those skilled in this art that various changes and modifications may be made therein without departing from the spirit or scope of the invention.

What is claimed is:

1. A wheel drive key and heatshield assembly adapted for mounting in association with a plurality of wheel drive key bosses which are axially and longitudinally oriented and formed as integral parts within an inboard-facing bore of a forged wheel comprising in combination:

a plurality of flat, rectangular, metallic drive key wearplates, the number being equal to twice the number of wheel key bosses and mounted in pairs to the bosses, each wearplate being in contacting engagement with a longitudinal side surface of a wheel key boss and having at least two slots in spaced relationship within top and bottom longitudinal edges thereof;

retaining means mounted transversely across the top of each of said wheel key bosses and having a length which extends beyond the width of the boss to engage the pair of wearplates in the slots formed within the top edges of the wearplates; and a plurality of substantially rectangular heatshields positioned within the wheel bore between adjacent wheel key bosses, each said heatshield having at least two tabs extending from opposite lateral edges thereof to engage the wearplates within the slots formed in the bottom edges of the wearplates, said heatshields being restricted by said wearplate engagement in both axial and radial directions within the bore of the wheel.

2. The assembly as set forth in claim 1 wherein each retaining means is mounted by way of a fastener threaded into the top of the wheel key boss and the ends which extend beyond the width of the boss are bent downwardly to contact a bottom surface within a slot in the top edge of a wearplate.

3. The assembly as set forth in claim 1 wherein the length L1 of each slot in the top edge of a wearplate is slightly longer than the width W1 of a retaining means and the length L2 of a slot in the bottom edge of a wearplate is slightly longer than the width W2 of a tab which extends from a lateral edge of the heatshield.

4. The assembly as set forth in claim 1 wherein a slot in the top edge of a wearplate has a bottom surface which tapers downwardly at an angle with respect to the top surface edge of the wearplate.

5. The assembly as set forth in claim 4 wherein the angle is symmetrical with respect to a centerline through the middle of the bottom surface.

6. The assembly as set forth in claim 1 wherein the heatshields are mounted in such a way as to be in spaced relationship to the surface of the wheel bore.

7. The assembly as set forth in claim 6 wherein the spaced relationship is accomplished by a longitudinal groove and groove wall machined into the wheel bore at the base of each wheel key boss, the lateral edge tabs of the heatshield being mounted on the groove walls between adjacent wheel key bosses.

8. The assembly as set forth in claim 6 wherein the spaced relationship of the heatshields is accomplished by bending the lateral edges which form the edge tabs thereof such that when a heatshield is positioned between adjacent wheel key bosses the bent lateral edges contact the wheel bore surface to support the heatshield in spaced position therefrom while also forming a support for the bottom edges of a respective drive key wearplate.

9. The assembly as set forth in claim 2 wherein the retaining means comprises a spring steel member.

10. A drive key and heatshield assembly adapted for mounting in association with a plurality of longitudinal and axially-oriented wheel key bosses which are integrally formed on an inboard-facing surface of a forged wheel bore comprising in combination:

a plurality of rectangularly-shaped drive key wearplates, each wearplate mounted to a side longitudinal surface of a wheel key boss and characterized by at least two longitudinal slots within the top surface lateral edge and at least two longitudinal slots within the bottom surface lateral edge thereof;

retaining means mounted transversely across the top of each wheel key boss, each retaining means comprising a spring steel member having a length which extends beyond the wheel key boss to engage a pair of mounted drive key wearplates within their respective top surface lateral edge slots;

means to fasten each spring steel member to the wheel key boss; and a plurality of substantially rectangularly-shaped metallic heatshields each exhibiting a curvature which substantially matches the curvature of the wheel bore and having at least two tabs extending from each of two opposite lateral side edges such that when a heatshield is mounted within the wheel bore between adjacent pairs of wheel key bosses the tabs engage the slots within the bottom surface lateral edges of respective drive key wearplates, the engagement being such that a heatshield may not move substantially in either the radial or axial direction with respect to the axis of rotation of the wheel.

* * * * *